United States Patent
Usoro

(10) Patent No.: US 7,582,034 B2
(45) Date of Patent: *Sep. 1, 2009

(54) VARIABLE SPEED ACCESSORY DRIVE SYSTEM FOR A HYBRID VEHICLE

(75) Inventor: Patrick B. Usoro, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 247 days.

This patent is subject to a terminal disclaimer.

(21) Appl. No.: 11/467,019

(22) Filed: Aug. 24, 2006

(65) Prior Publication Data

US 2008/0051242 A1 Feb. 28, 2008

(51) Int. Cl.
F16H 3/72 (2006.01)

(52) U.S. Cl. .......................................... 475/5; 180/65.2

(58) Field of Classification Search ...................... 475/5; 180/65.2–65.6
See application file for complete search history.

(56) References Cited

U.S. PATENT DOCUMENTS 5,558,173 A * 9/1996 Sherman ..................... 903/910
6,793,059 B2 * 9/2004 Okada et al. .................... 477/5
6,863,139 B2 * 3/2005 Egami et al. ................. 903/910
6,910,453 B2 * 6/2005 Sugino et al. .......... 123/179.28
2005/0124451 A1 * 6/2005 Morikawa ....................... 475/6
2005/0150228 A1 * 7/2005 Gray ........................... 60/709

* cited by examiner

Primary Examiner—Charles A Marmor
Assistant Examiner—Derek D Knight
(74) Attorney, Agent, or Firm—Quinn Law Group, PLLC

(57) ABSTRACT

The present invention provides an accessory drive system for a hybrid vehicle. The accessory drive system includes a planetary gear set having a first, second, and third planetary member. A torque transfer device operatively connects an engine with the first planetary member. A motor/generator is operatively connected to the second planetary member, and a plurality of accessories are operatively connected to the third planetary member. A one-way clutch is preferably operatively connected to either the first planetary member or the torque transfer device such that the accessories can be effectively driven by the motor/generator when the engine is off. Engine output is transferable through the planetary gear set to drive the accessories, and the speed at which the accessories are driven is selectable by controlling the speed of the motor/generator.

11 Claims, 6 Drawing Sheets

VARIABLE SPEED ACCESSORY DRIVE SYSTEM FOR A HYBRID VEHICLE

TECHNICAL FIELD

The present invention pertains generally to a variable speed accessory drive system for a hybrid vehicle.

BACKGROUND OF THE INVENTION

Driven accessories in a hybrid vehicle may include, for example, an air conditioning compressor, a power steering pump, and an alternator. These accessories are generally powered by output from the engine. Some of the accessories in a hybrid vehicle may require power while the engine is off and the vehicle is being powered by an electric motor/generator. Traditionally, in order to power hybrid vehicle accessories when the engine is off, it was necessary to provide each such accessory with a separate electric motor.

Conventional automotive accessory drive systems include a drive pulley connected to an engine output shaft. A flexible chain or belt couples the drive pulley with a plurality of driven pulleys that are each operatively connected to an accessory. The operating speeds of the accessories in such a conventional drive system are directly proportional to the speed of the engine. Since the engine operates over a wide speed range (i.e., for example, between 500 rpm and 8,000 rpm), the accessories are typically designed to provide full capacity at the low end of the engine speed range in order to ensure that they remain operational. Therefore, at higher engine speeds, excess energy transferred to the accessories may be lost.

SUMMARY OF THE INVENTION

The present invention provides an accessory drive system for a hybrid vehicle. The accessory drive system includes a planetary gear set having a first, second, and third planetary member. A first torque transfer device operatively connects an engine with the first planetary member. A motor/generator is operatively connected to the second planetary member, and a plurality of accessories are operatively connected to the third planetary member through a second torque transfer device. A one-way clutch or brake is preferably operatively connected between a stationary member and either the first planetary member or the first torque transfer device such that it prevents the engine from being rotated backwards and such that it can provide the reaction torque to enable the accessories to be driven by the motor/generator when the engine is off. Engine output is transferable through the planetary gear set to drive the accessories, and the speed at which the accessories are driven is selectable by controlling the speed of the motor/generator.

According to the preferred embodiment, the first planetary member is a ring gear member, the second planetary member is a sun gear member, and the third planetary member is a planet carrier member.

According to an alternate embodiment, the first planetary member is a sun gear member, the second planetary member is a planet carrier member, and the third planetary member is a ring gear member.

According to another alternate embodiment, the first planetary member is a ring gear member, the second planetary member is a planet carrier member, and the third planetary member is a sun gear member.

According to another alternate embodiment, the first planetary member is a planet carrier member, the second planetary member is a ring gear member, and the third planetary member is a sun gear member.

According to another alternate embodiment, the first planetary member is a planet carrier member, the second planetary member is a sun gear member, and the third planetary member is a ring gear member.

According to another alternate embodiment, the first planetary member is a sun gear member, the second planetary member is a ring gear member, and the third planetary member is a planet carrier member.

The above features and advantages and other features and advantage of the present invention are readily apparent from the following detailed description of the best modes for carrying out the invention when taken in connection with the accompanying drawings.

DESCRIPTION OF THE PREFERRED EMBODIMENTS

Conventional accessory drive systems operate by transferring engine output directly to the accessories so the accessories are driven at a speed directly proportional to engine speed. Since the engine operates over a wide speed range (e.g., between 500 rpm and 8,000 rpm), the accessories are typically designed to provide full capacity at the low end of the engine speed range in order to ensure they remain fully operational. Therefore, when the engine is operating at higher speeds, conventional accessory drive systems transfer more energy to the accessories than necessary to provide adequate function. The excess energy transferred to the accessories causes inefficiency and diminishes fuel economy. The accessory drive system 10 (shown in FIG. 1) of the present invention allows the accessories to be driven at a predetermined optimal speed independent from the speed at which the engine is running in order to improve fuel economy.

Figure 1:
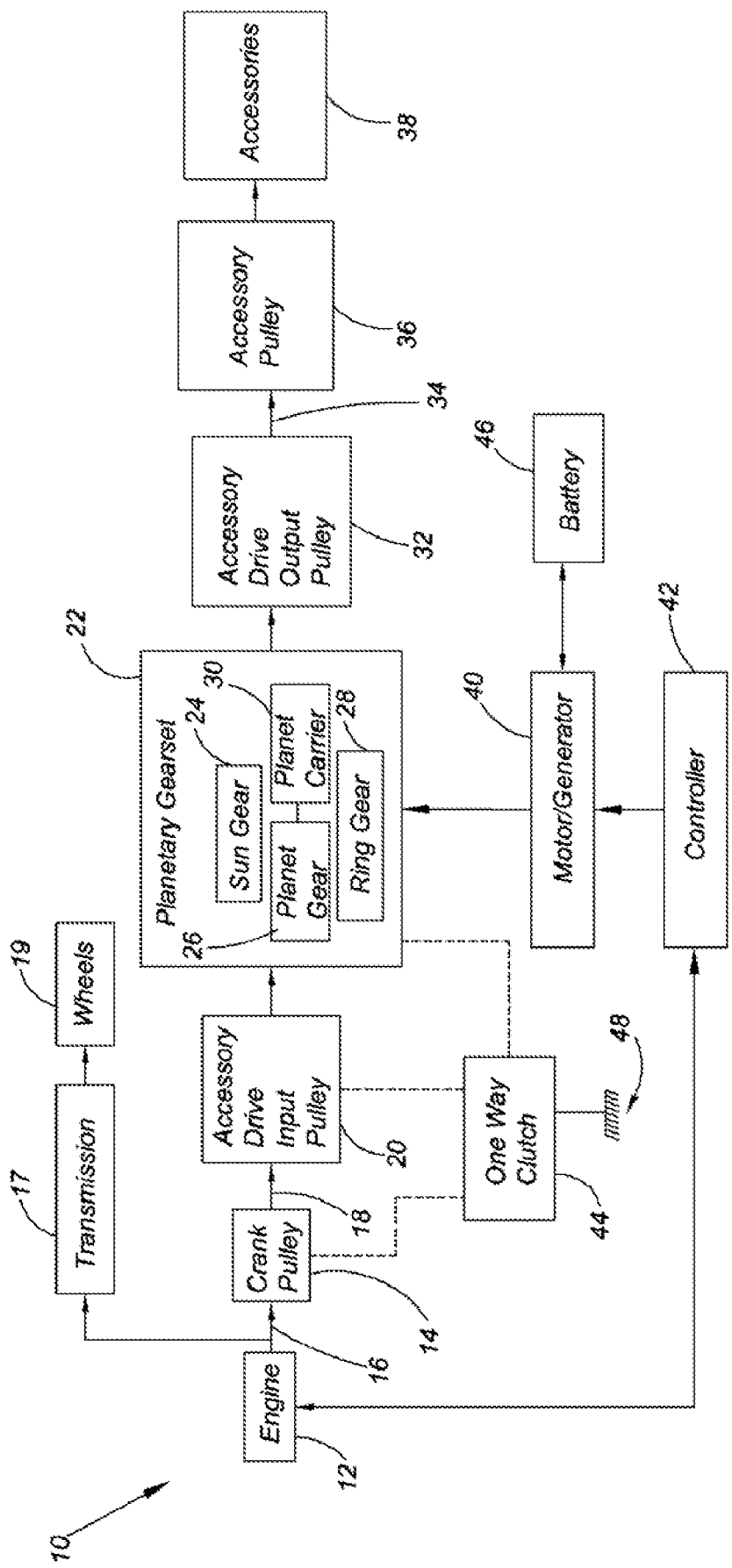
FIG. 1 is a schematic depiction of an accessory drive system for a hybrid vehicle.

Referring to FIG. 1, a schematic representation of an accessory drive system 10 for a hybrid vehicle is shown. The accessory drive system 10 includes an engine 12 configured to transmit output to a crank pulley 14 via a crankshaft or output shaft 16. A first belt or chain 18 couples the crank pulley 14 with an accessory drive input pulley 20. The accessory drive input pulley 20 is operatively connected to a differential transmission such as the planetary gear set 22. The planetary gear set 22 has a plurality of members including: a sun gear 24; a plurality of pinions or planet gears 26; a ring gear 28; and a pinion carrier or planet carrier 30.

The engine 12 also transfers output via the crankshaft 16 to a transmission 17. The transmission 17 transfers output from the engine 12 to a plurality of wheels 19 in order to drive a hybrid vehicle. It should be appreciated that the transmission 17 and wheels 19 may include any known configurations and are not included as part of the accessory drive system 10 of the present invention.

The planetary gear set 22 is configured to convert the rotational velocity of the accessory drive input pulley 20 (which runs at a fixed ratio of engine speed) to a predetermined value selected to efficiently drive the accessories 38. In other words, the planetary gear set 22 can selectively increase or decrease the magnitude of the rotational velocity from the accessory drive input pulley 20 in order to drive the accessories 38 at more efficient speed and thereby improve fuel economy. Output from the planetary gear set 22 is transferred to an accessory drive output pulley 32. A second belt or chain 34 couples the accessory drive output pulley 32 with one or more accessory pulleys 36. The accessory pulleys 36 are each operatively connected to an accessory 38.

A motor/generator 40 is configured to selectively transfer torque to the planetary gear set 22 either directly or through a transfer device such as, for example, a belt, chain, gear set, differential gear, etc. The motor/generator 40 is configured to receive power from and/or transfer power to a storage device such as the battery 46. As is known in the art, by transferring a first predetermined amount of input torque from the engine 12 to one of the planetary gear set 22 members, and transferring a second predetermined amount of input torque from the motor/generator 40 to another of the planetary gear set 22 members, the planetary gear set 22 can be controlled to produce a selectable amount of output torque from yet another of its members. Therefore, by controlling the amount of torque transferred from the motor generator 40 to the planetary gear set 22, the planetary gear set 22 output speed is selectable within an operational range.

The engine 12 and the motor/generator 40 are operatively connected to a controller 42. The controller 42 receives input from the engine 12 indicating the current engine speed and calculates a corresponding motor/generator 40 speed or torque value required to produce a predetermined planetary gear set 22 output speed. As an example, if the engine 12 is running at 4,000 rpm and the accessories 38 are optimized to run at 1,500 rpm, the controller 42 calculates the motor/generator 40 speed required to produce a planetary gear set 22 output speed of 1,500 rpm. These types of calculations which utilize the ring/sun tooth ratios of a planetary gear set are well known to those skilled in the art and therefore will not be described in detail hereinafter. After calculating, the controller 42 commands the motor/generator 40 to transfer the required amount of torque to the planetary gear set 22 such that the accessories 38 are driven in an optimally efficient manner.

A one-way clutch 44 is operatively connected between a stationary member 48 and either the crank pulley 14, the accessory drive input pulley 20, or a member of the planetary gear set 22. According to an alternate embodiment, the one way clutch 44 may be replaced with a selectively engageable brake. The one-way clutch 44 is implemented to allow the motor/generator 40 to efficiently power the accessories 38 when the engine 12 is off. It should be appreciated that without the one-way clutch 44, the motor/generator 40 could transfer at least a portion of its output torque back to the engine 12 when the engine 12 is off, and that the torque transferred back to the engine 12 could cause the engine to rotate backwards. Therefore, the one-way clutch 44 prevents the transfer of torque from the motor/generator 40 back to the engine 12 and provides the reaction torque necessary to enable the motor/generator 40 to efficiently run the accessories 38. Conventional hybrid vehicle accessory drive systems typically implement individual electric motors for each accessory in order to power the accessories when the engine is off. The accessory drive system 10 of the present invention reduces cost as compared to conventional systems by implementing fewer components (i.e., a single motor/generator 40) to drive all the accessories 38, and by allowing the use of mass-produced conventional accessories.

Having explained the components and functionality of the accessory drive system 10, the precise interconnection of these components will now be described in accordance with a plurality of different embodiments. FIGS. 2-11 each illustrate a separate embodiment that functions similarly to the previously described accessory drive system 10, but includes somewhat different component connections. Like reference numbers are used in FIGS. 2-11 to refer to like components from FIG. 1. Additionally, the letters "a" through "j" added as a suffix to a reference numeral identifies a similar component in a different embodiment. As an example, the engine 12 of FIG. 1 functions similarly to the engines 12a-12j of FIGS. 2-11, respectively. Therefore, unless specified otherwise, the components of FIGS. 2-11 identified with a base reference number followed by one of the letters "a" through "j" should be considered to be identical to a respective component of FIG. 1 identified with a common base reference number.

Figure 2:
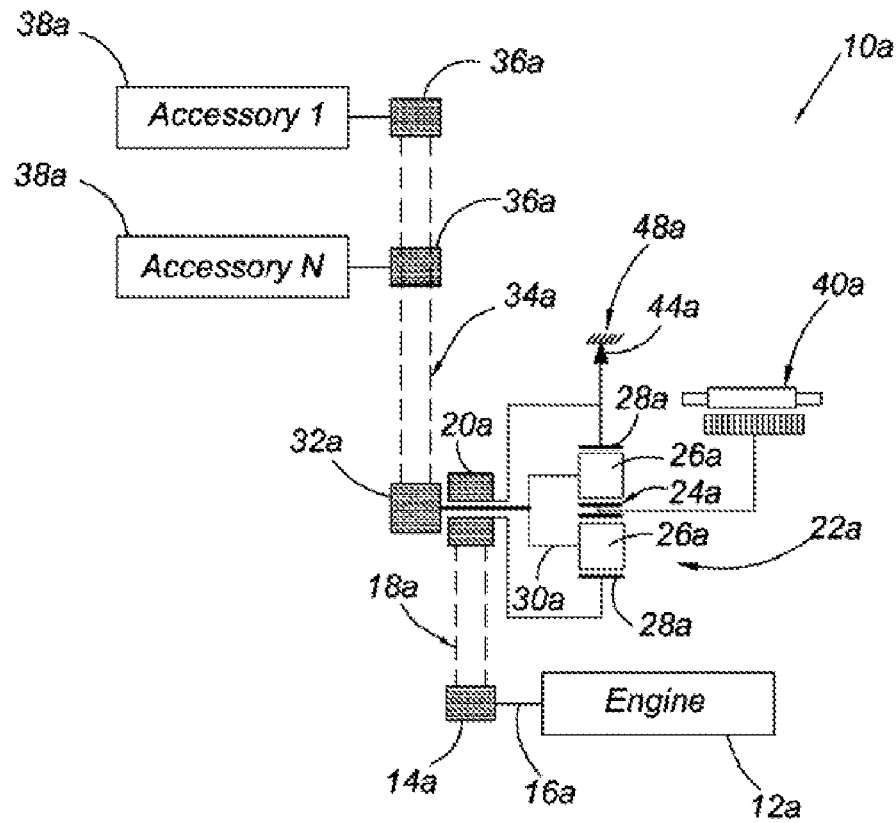
FIG. 2 is a more detailed schematic depiction of the accessory drive system of FIG. 1 in accordance with the preferred embodiment of the present invention.

Referring to FIG. 2, an accessory drive system 10a is shown in accordance with the preferred embodiment of the present invention. The accessory drive input pulley 20a (which runs at a fixed ratio of engine speed) is operatively connected to the ring gear 28a of the planetary gear set 22a. The motor/generator 40a is operatively connected to the sun gear 24a of the planetary gear set 22a. The planet carrier 30a of the planetary gear set 22a is operatively connected to the accessory drive output pulley 32a. Therefore, in response to input from the engine 12a (via the ring gear 28a) and/or the motor/generator 40a (via the sun gear 24a), the planetary gear set 22a can transfer output to the accessory drive output pulley 32a (via the planet carrier 30a) and thereby drive the accessories 38a at a selectable rate. The one-way clutch 44a is operatively connected to the ring gear 28a and the stationary member 48a such that, when the engine 12a is off, the ring gear 28a is restrained from rotating in the reverse direction and the motor/generator 40a can be implemented to drive the accessories 38a at a selectable rate.

Figure 3:
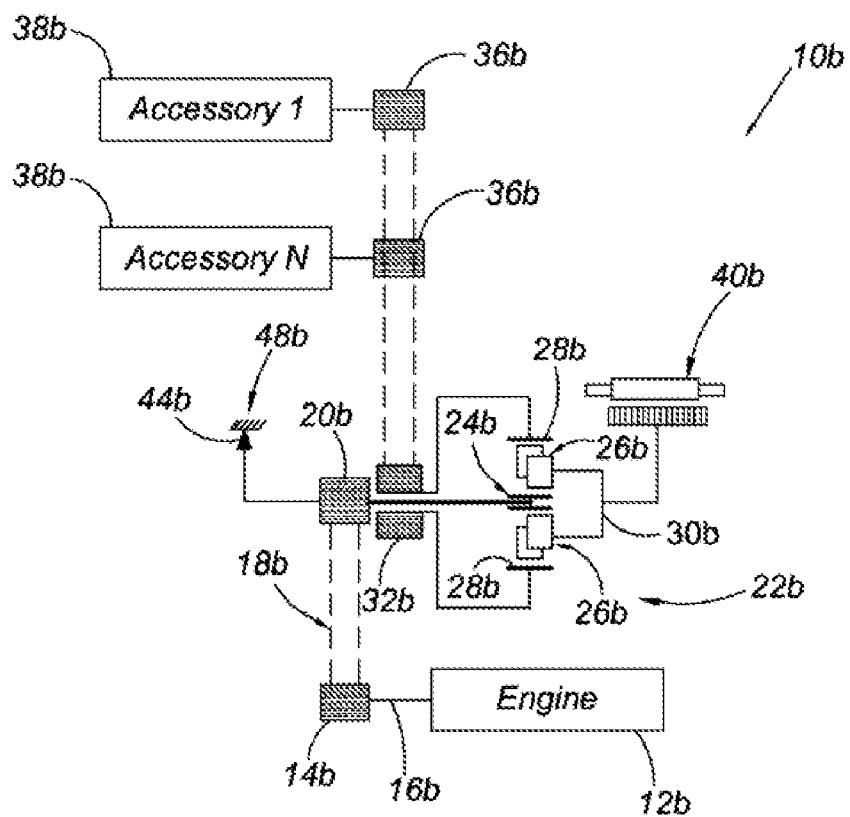
FIG. 3 is a more detailed schematic depiction of the accessory drive system of FIG. 1 in accordance with an alternate embodiment of the present invention.

Referring to FIG. 3, an accessory drive system 10b is shown in accordance with an alternate embodiment of the present invention. The planetary gear set 22b of this embodiment preferably includes a double-pinion carrier 30b configuration. The accessory drive input pulley 20b (which runs at a fixed ratio of engine speed) is operatively connected to the sun gear 24b of the planetary gear set 22b. The motor/generator 40b is operatively connected to the double-pinion carrier 30b of the planetary gear set 22b. The ring gear 28b of the planetary gear set 22b is operatively connected to the accessory drive output pulley 32b. Therefore, in response to input from the engine 12b (via the sun gear 24b) and/or the motor/generator 40b (via the double-pinion carrier 30b), the planetary gear set 22b can transfer output to the accessory drive output pulley 32b (via the ring gear 28b) and thereby drive the accessories 38b at a selectable rate. The one-way clutch 44b is operatively connected to the accessory drive input pulley 20b and the stationary member 48b such that, when the engine 12a is off, the sun gear 24b is restrained from rotating in the reverse direction and the motor/generator 40b can be implemented to drive the accessories 38b at a selectable rate.

Figure 4:
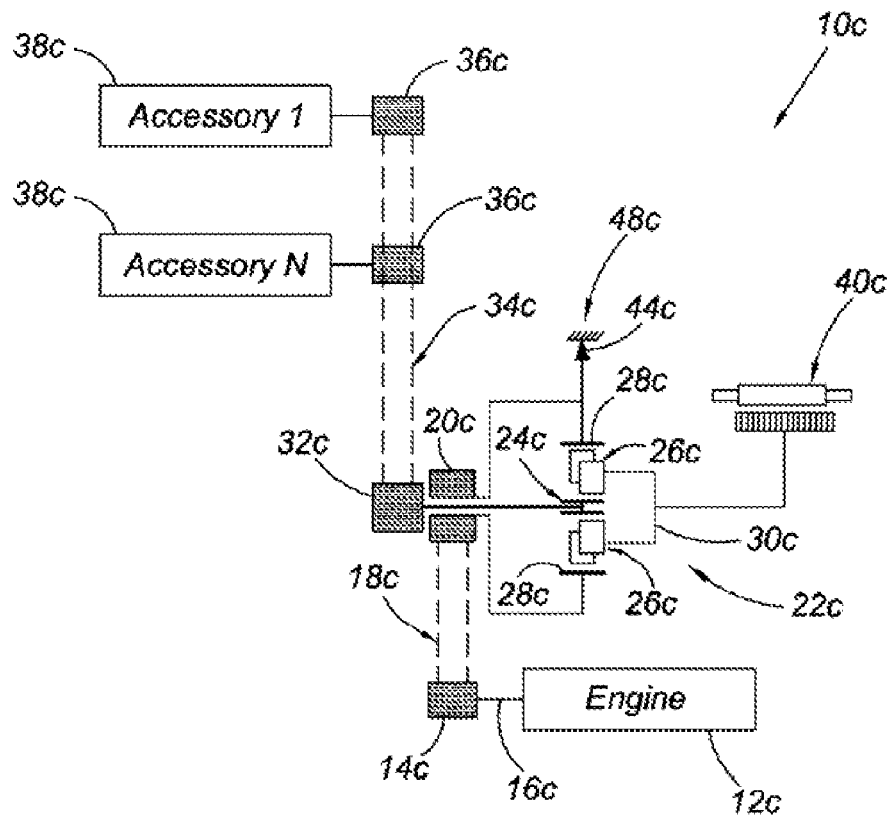
FIG. 4 is a more detailed schematic depiction of the accessory drive system of FIG. 1 in accordance with an alternate embodiment of the present invention.

Referring to FIG. 4, an accessory drive system 10c is shown in accordance with an alternate embodiment of the present invention. The planetary gear set 22c of this embodiment preferably includes a double-pinion carrier 30c configuration. The accessory drive input pulley 20c (which runs at a fixed ratio of engine speed) is operatively connected to the ring gear 28c of the planetary gear set 22c. The motor/generator 40c is operatively connected to the double-pinion carrier 30c of the planetary gear set 22c. The sun gear 24c of the planetary gear set 22c is operatively connected to the accessory drive output pulley 32c. Therefore, in response to input from the engine 12c (via the ring gear 28c) and/or the motor/generator 40c (via the double-pinion carrier 30c), the planetary gear set 22c can transfer output to the accessory drive output pulley 32c (via the sun gear 24c) and thereby drive the accessories 38c at a selectable rate. The one-way clutch 44c is operatively connected to the ring gear 28c and the stationary member 48c such that, when the engine 12a is off, the ring gear 28c is restrained from rotating in the reverse direction and the motor/generator 40c can be implemented to drive the accessories 38c at a selectable rate.

Figure 5:
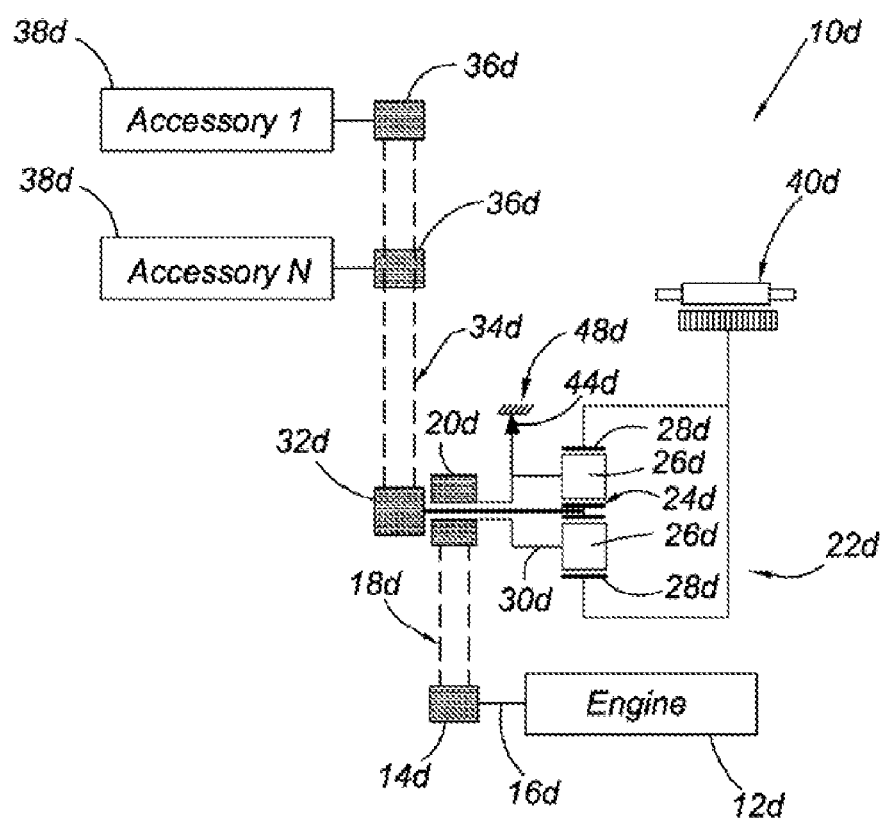
FIG. 5 is a more detailed schematic depiction of the accessory drive system of FIG. 1 in accordance with an alternate embodiment of the present invention.

Referring to FIG. 5, an accessory drive system 10d is shown in accordance with an alternate embodiment of the present invention. The accessory drive input pulley 20d (which runs at a fixed ratio of engine speed) is operatively connected to the planet carrier 30d of the planetary gear set 22d. The motor/generator 40d is operatively connected to the ring gear 28d of the planetary gear set 22d. The sun gear 24d of the planetary gear set 22d is operatively connected to the accessory drive output pulley 32d. Therefore, in response to input from the engine 12d (via the planet carrier 30d) and/or the motor/generator 40d (via the ring gear 28d), the planetary gear set 22d can transfer output to the accessory drive output pulley 32d (via the sun gear 24d) and thereby drive the accessories 38d at a selectable rate. The one-way clutch 44d is operatively connected to the planet carrier 30d and the stationary member 48d such that, when the engine 12d is off, the planet carrier 30d is restrained from rotating in the reverse direction and the motor/generator 40d can be implemented to drive the accessories 38d at a selectable rate.

Figure 6:
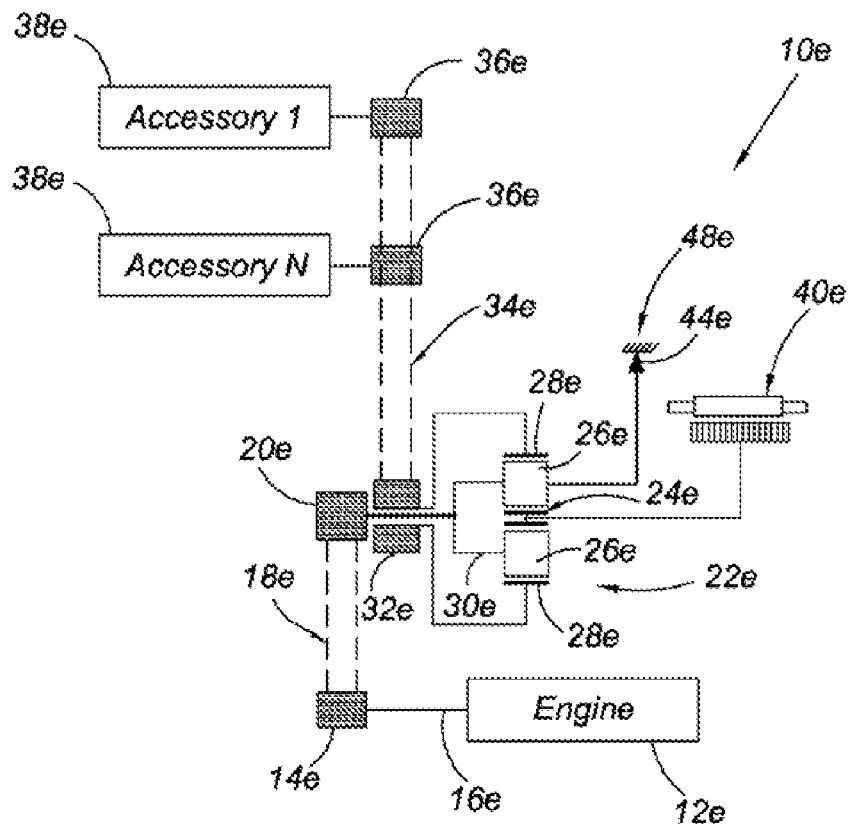
FIG. 6 is a more detailed schematic depiction of the accessory drive system of FIG. 1 in accordance with an alternate embodiment of the present invention.

Referring to FIG. 6, an accessory drive system 10e is shown in accordance with an alternate embodiment of the present invention. The accessory drive input pulley 20e (which runs at a fixed ratio of engine speed) is operatively connected to the planet carrier 30e of the planetary gear set 22e. The motor/generator 40e is operatively connected to the sun gear 24e of the planetary gear set 22e. The ring gear 28e of the planetary gear set 22e is operatively connected to the accessory drive output pulley 32e. Therefore, in response to input from the engine 12e (via the planet carrier 30e) and/or the motor/generator 40e (via the sun gear 24e), the planetary gear set 22e can transfer output to the accessory drive output pulley 32e (via the ring gear 28e) and thereby drive the accessories 38e at a selectable rate. The one-way clutch 44e is operatively connected to the planet carrier 30e and the stationary member 48e such that, when the engine 12e is off, the planet carrier 30e is restrained from rotating in the reverse direction and the motor/generator 40e can be implemented to drive the accessories 38e at a selectable rate.

Figure 7:
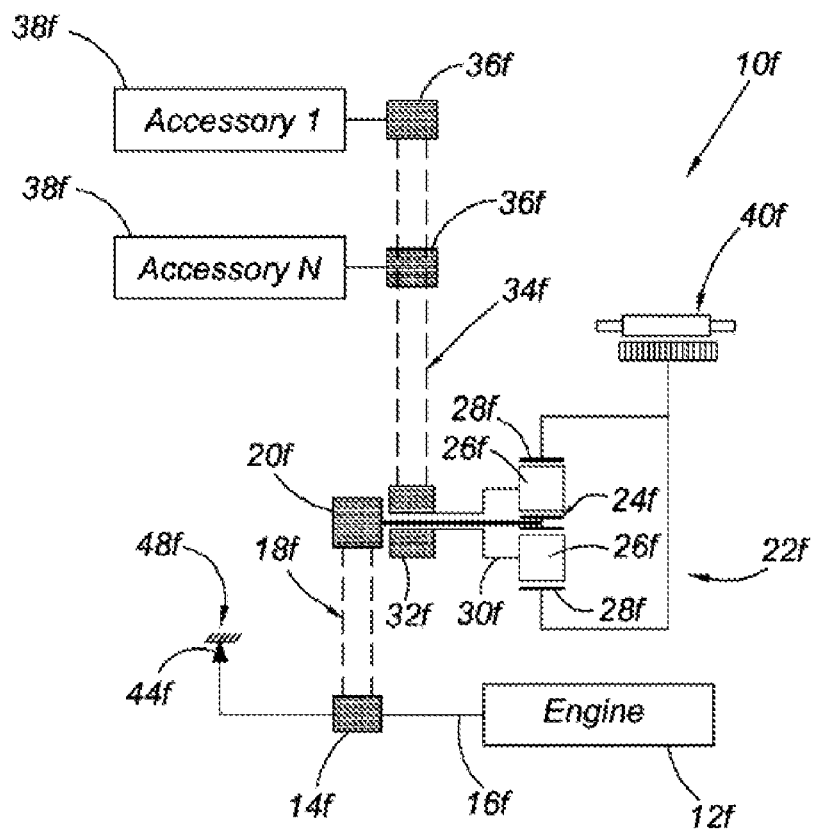
FIG. 7 is a more detailed schematic depiction of the accessory drive system of FIG. 1 in accordance with an alternate embodiment of the present invention.

Referring to FIG. 7, an accessory drive system 10f is shown in accordance with an alternate embodiment of the present invention. The accessory drive input pulley 20f (which runs at a fixed ratio of engine speed) is operatively connected to the sun gear 24f of the planetary gear set 22f. The motor/generator 40f is operatively connected to the ring gear 28f of the planetary gear set 22f. The planet carrier 30f of the planetary gear set 22f is operatively connected to the accessory drive output pulley 32f. Therefore, in response to input from the engine 12f (via the sun gear 24f) and/or the motor/generator 40f (via the ring gear 24f), the planetary gear set 22f can transfer output to the accessory drive output pulley 32f (via the planet carrier 30f) and thereby drive the accessories 38f at a selectable rate. The one-way clutch 44f is operatively connected to the crank pulley 14f and the stationary member 48f such that, when the engine 12f is off, the sun gear 24f is restrained from rotating in the reverse direction and the motor/generator 40f can be implemented to drive the accessories 38f at a selectable rate.

Figure 8:
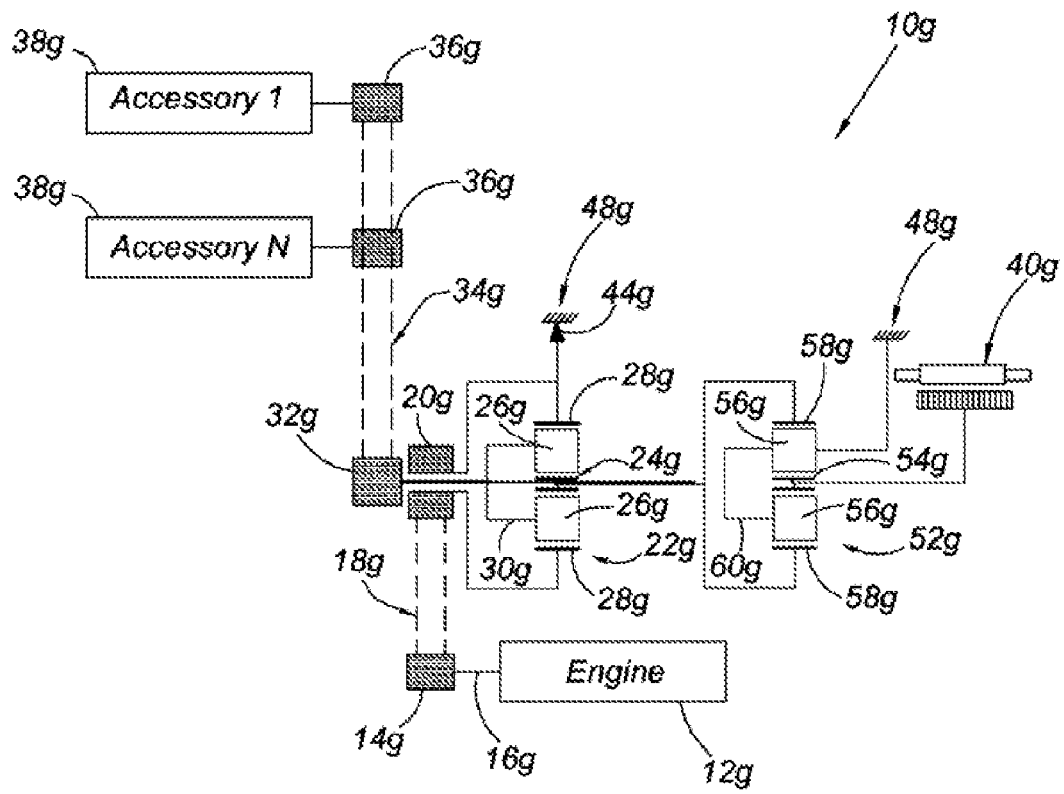
FIG. 8 is a more detailed schematic depiction of the accessory drive system of FIG. 1 in accordance with an alternate embodiment of the present invention.

Referring to FIG. 8, an accessory drive system 10g is shown in accordance with an alternate embodiment of the present invention. In addition to the previously identified accessory drive system components of the preferred embodiment, the accessory drive system 10g also includes a second planetary gear set 52g operatively connected to the planetary gear set 22g. The second planetary gear set 52g includes a sun gear 54g, a plurality of planet gears 56g, a ring gear 58g, and a planet carrier 60g. The interconnection of the components of the first and second planetary gear sets 22g, 52g are shown in accordance with the preferred embodiment. It should, however, be appreciated by one skilled in the art that alternate planetary gear set component connections may be envisioned.

The accessory drive input pulley 20g (which runs at a fixed ratio of engine speed) is operatively connected to the ring gear 28g of the planetary gear set 22g. The ring gear 58g of the second planetary gear set 52g is operatively connected to the sun gear 24g of the planetary gear set 22g. The motor/generator 40g is operatively connected to the sun gear 54g of the second planetary gear set 52g. The planet carrier 30g of the planetary gear set 22g is operatively connected to the accessory drive output pulley 32g, and the planet carrier 60g of the second planetary gear set 52g is grounded or held stationary. Therefore, in response to input from the engine 12g (via the ring gear 28g) and/or the motor/generator 40g (via the sun gear 54g), the planetary gear sets 22g, 52g can transfer output to the accessory drive output pulley 32g (via the planet carrier 30g) and thereby drive the accessories 38g at a selectable rate. The one-way clutch 44g is operatively connected to the ring gear 28g and the stationary member 48g such that, when the engine 12g is off, the ring gear 28g is restrained from rotating in the reverse direction and the motor/generator 40g can be implemented to drive the accessories 38g at a selectable rate.

Figure 9:
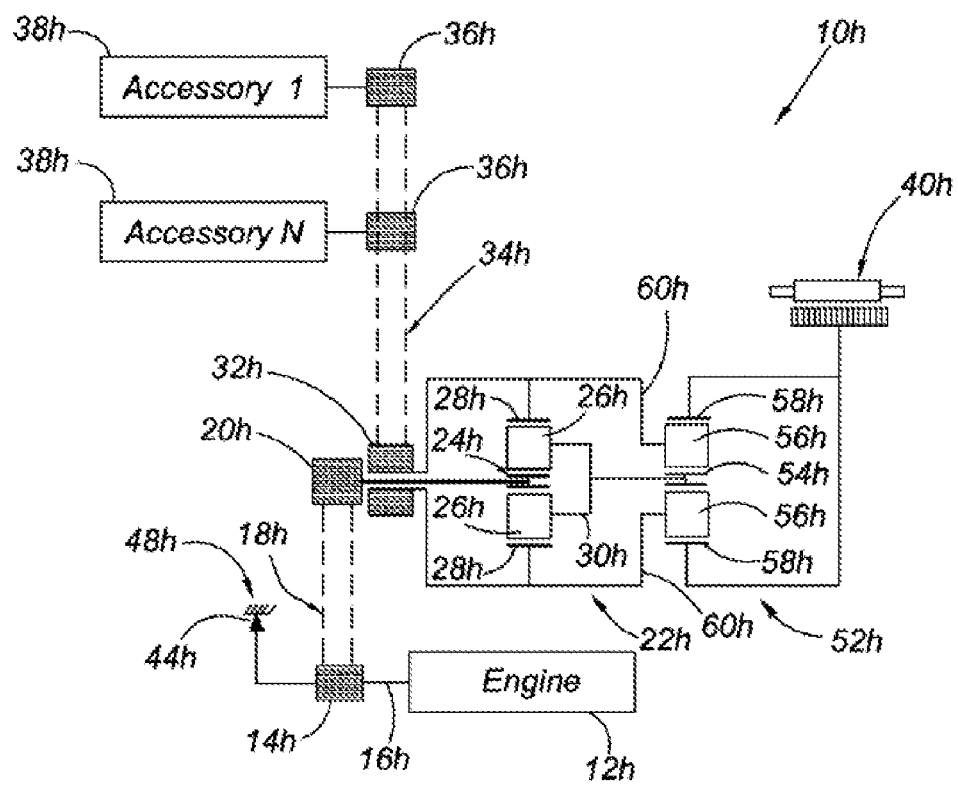
FIG. 9 is a more detailed schematic depiction of the accessory drive system of FIG. 1 in accordance with an alternate embodiment of the present invention.

Referring to FIG. 9, an accessory drive system 10h is shown in accordance with an alternate embodiment of the present invention. In addition to the previously identified accessory drive system components of the preferred embodiment, the accessory drive system 10h also includes a second planetary gear set 52h operatively connected to the planetary gear set 22h. The second planetary gear set 52h includes a sun gear 54h, a plurality of planet gears 56h, a ring gear 58h, and a planet carrier 60h. The interconnection of the components of the first and second planetary gear sets 22h, 52h are shown in accordance with an alternate embodiment. It should, however, be appreciated by one skilled in the art that alternate planetary gear set component connections may be envisioned.

The accessory drive input pulley 20h (which runs at a fixed ratio of engine speed) is operatively connected to the sun gear 24h of the planetary gear set 22h. The planet carrier 60h of the second planetary gear set 52h is operatively connected to the ring gear 28h of the planetary gear set 22h. The motor/generator 40h is operatively connected to the ring gear 58h of the second planetary gear set 52h. The ring gear 28h of the planetary gear set 22h is operatively connected to the accessory drive output pulley 32h. Therefore, in response to input from the engine 12h (via the sun gear 24h) and/or the motor/generator 40h (via the ring gear 58h), the planetary gear sets 22h, 52h can transfer output to the accessory drive output pulley 32h (via the ring gear 28h) and thereby drive the accessories 38h at a selectable rate. The one-way clutch 44h is operatively connected to the crank pulley 14h and the stationary member 48h such that, when the engine 12h is off, the sun gear 24h is restrained from rotating in the reverse direction and the motor/generator 40h can be implemented to drive the accessories 38h at a selectable rate.

Figure 10:
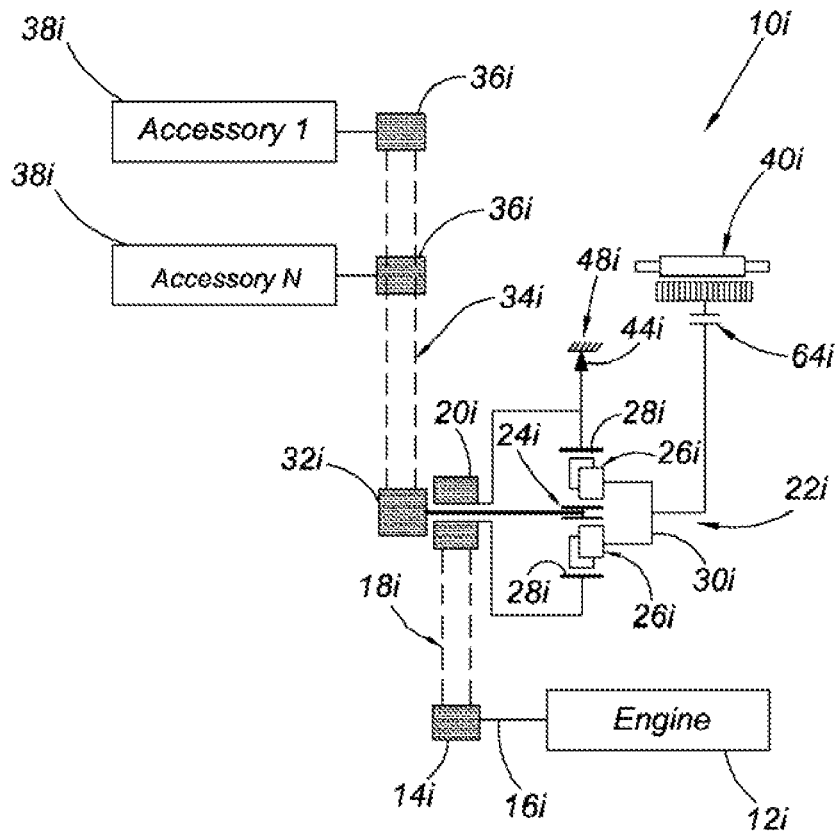
FIG. 10 is a more detailed schematic depiction of the accessory drive system of FIG. 1 in accordance with an alternate embodiment of the present invention.

Referring to FIG. 10, an accessory drive system 10i is shown in accordance with an alternate embodiment of the present invention. The planetary gear set 22i of this embodiment preferably includes a double-pinion carrier 30i configuration. The accessory drive input pulley 20i (which runs at a fixed ratio of engine speed) is operatively connected to the ring gear 28i of the planetary gear set 22i. A gear assembly 64i couples the motor/generator 40i with the double-pinion carrier 30i of the planetary gear set 22i. The sun gear 24i of the planetary gear set 22i is operatively connected to the accessory drive output pulley 32i. Therefore, in response to input from the engine 12i (via the ring gear 28i) and/or the motor/generator 40i (via the double-pinion carrier 30i), the planetary gear set 22i can transfer output to the accessory drive output pulley 32i (via the sun gear 24i) and thereby drive the accessories 38i at a selectable rate. The one-way clutch 44i is operatively connected to the ring gear 28i and the stationary member 48i such that, when the engine 12i is off, the ring gear 28i is restrained from rotating in the reverse direction and the motor/generator 40i can be implemented to drive the accessories 38i at a selectable rate.

Figure 11:
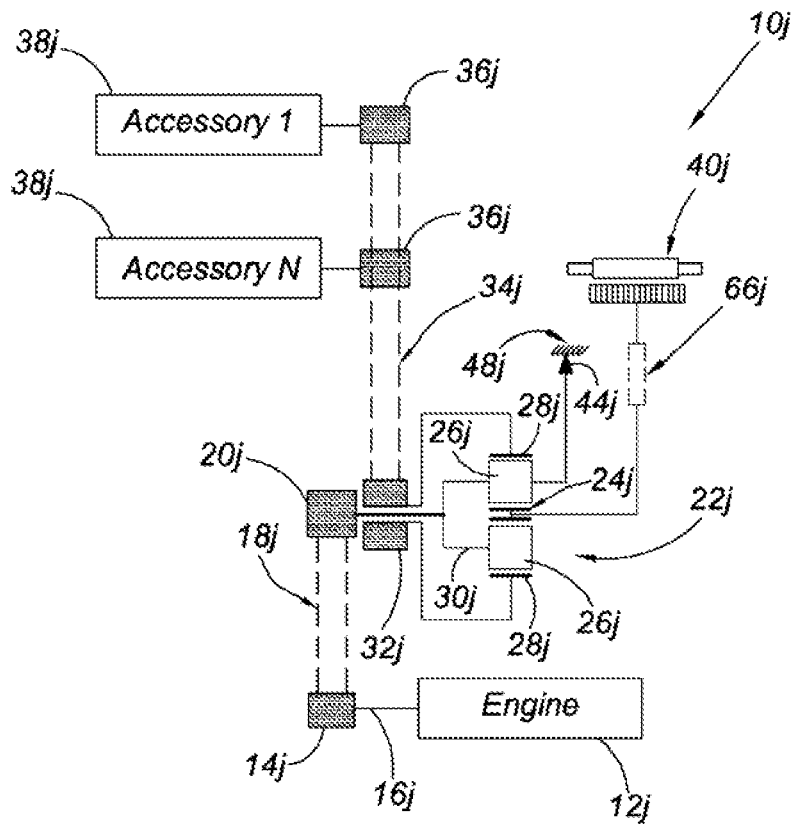
FIG. 11 is a more detailed schematic depiction of the accessory drive system of FIG. 1 in accordance with an alternate embodiment of the present invention.

Referring to FIG. 11, an accessory drive system 10j is shown in accordance with an alternate embodiment of the present invention. The accessory drive input pulley 20j (which runs at a fixed ratio of engine speed) is operatively connected to the planet carrier 30j of the planetary gear set 22j. A third belt or chain 66j couples the motor/generator 40j and the sun gear 24j of the planetary gear set 22j. The ring gear 28j of the planetary gear set 22j is operatively connected to the accessory drive output pulley 32j. Therefore, in response to input from the engine 12j (via the planet carrier 30j) and/or the motor/generator 40j (via the sun gear 24j), the planetary gear set 22j can transfer output to the accessory drive output pulley 32j (via the ring gear 28j) and thereby drive the accessories 38j at a selectable rate. The one-way clutch 44j is operatively connected to the planet carrier 30j and the stationary member 48j such that, when the engine 12j is off, the planet carrier 30j is restrained from rotating in the reverse direction and the motor/generator 40j can be implemented to drive the accessories 38j at a selectable rate.

While the best modes for carrying out the invention have been described in detail, those familiar with the art to which this invention relates will recognize various alternative designs and embodiments for practicing the invention within the scope of the appended claims.

The invention claimed is:

1. An accessory drive system for a hybrid vehicle comprising:
    a planetary gear set having a first, second, and third planetary member;
    an engine continuously connected to the first planetary member;
    a motor/generator continuously connected to the second planetary member;
    a plurality of accessories continuously connected to the third planetary member; and
    a selectively engageable torque transmitting device operatively connected to the planetary gear set, said selectively engageable torque transmitting device being configured to allow the plurality of accessories to be driven by the motor/generator when the engine is off;
    wherein engine output is transferable through the planetary gear set to drive the plurality of accessories, and the speed at which the plurality of accessories are driven is selectable by controlling the speed of the motor/generator.

2. The accessory drive system of claim 1, wherein the first planetary member is a ring gear member, the second planetary member is a sun gear member, and the third planetary member is a planet carrier member.

3. The accessory drive system of claim 1, wherein the first planetary member is a sun gear member, the second planetary member is a planet carrier member, and the third planetary member is a ring gear member.

4. The accessory drive system of claim 1, wherein the first planetary member is a ring gear member, the second planetary member is a planet carrier member, and the third planetary member is a sun gear member.

5. The accessory drive system of claim 1, wherein the first planetary member is a planet carrier member, the second planetary member is a ring gear member, and the third planetary member is a sun gear member.

6. The accessory drive system of claim 1, wherein the first planetary member is a planet carrier member, the second planetary member is a sun gear member, and the third planetary member is a ring gear member.

7. The accessory drive system of claim 1, wherein the first planetary member is a sun gear member, the second planetary member is a ring gear member, and the third planetary member is a planet carrier member.

8. The accessory drive system of claim 1, further comprising a gear assembly operatively connecting the motor/generator to the second planetary member.

9. The accessory drive system of claim 1, further comprising a belt operatively connecting the motor/generator to the second planetary member.

10. The accessory drive system of claim 1, wherein one of the first, second, and third planetary members is a double-pinion carrier.

11. The accessory drive system of claim 1, wherein one of the first, second, and third planetary members is a single-pinion carrier.

* * * * *